J. ROBERTSON.
Improvement in Lightning-Rods.
No. 129,683. Patented July 23, 1872.
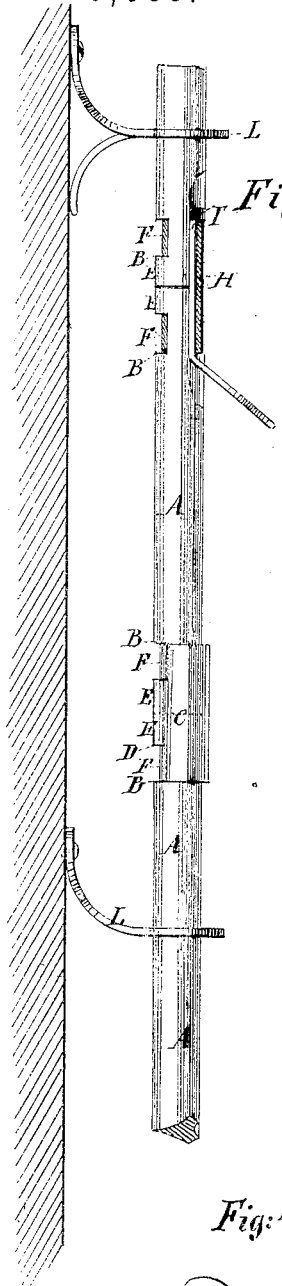
Fig. 1
Fig. 3.
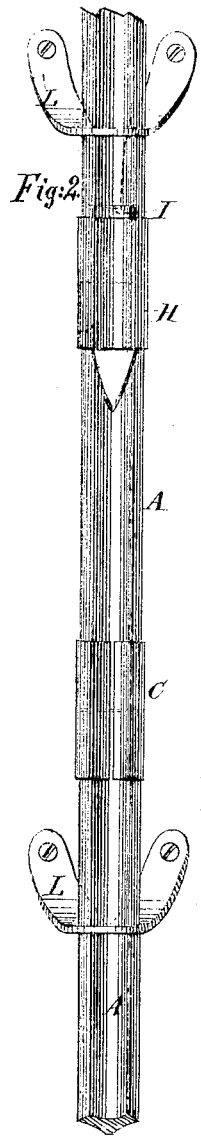
Fig. 2
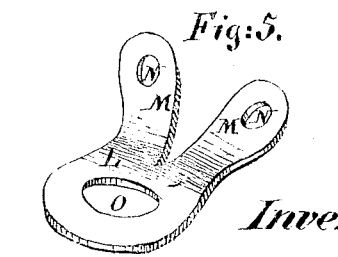
Fig. 4.  Fig. 5.
Witnesses  Inventor
James Price  James Robertson
James Lyman Price

UNITED STATES PATENT OFFICE.

JAMES ROBERTSON, OF NEW YORK, N. Y.

IMPROVEMENT IN LIGHTNING-RODS.

Specification forming part of Letters Patent No. 129,683, dated July 23, 1872; antedated June 28, 1872.

Specification of new and useful Improvements in Lightning-Rods, invented by JAMES ROBERTSON, of the city, county, and State of New York.

The first part of my invention consists of a sheet-metal coupling for ribbed, flanged, or other-shaped rods, made either of a small plate or a short section of a tube, which, having a slot through one side equidistant from the ends and extending about half the length, to receive a short section of one of the ribs of each joint to be coupled by it, is shaped to the form of the rod by bending it against the sides or into the grooves and pressing the parts at the end of the slot into notches behind the aforesaid sections, which are received in the slot in a manner to make a very cheap, simple, and permanent joint. In case a section of tube is used on a flanged rod, a wedge or key is introduced between the coupling and the rod at the side opposite the notched rib to confine said coupling in the notches and fill up the space, the coupling being necessarily larger than the rod at the notched part in order to slip over to the notches. The second part of the invention consists in having the flanged rods to be coupled by this improved coupling, made with three flutes and the same number of flanges in order to allow of applying the said couplings with one slot and by notching only one rib; also because the said couplings when made of sections of tubes can be readily shaped to the form of a three-flanged rod, while it is exceedingly difficult to shape it to a four-flanged rod after fitting it to the notches of the rod, and it would be necessary to notch two ribs of such a rod and make two slots in the coupling. The third part of the invention consists in having the key used to wedge out the tubular coupling prolonged beyond the lower end of said coupling, and bent outward to form a point for the escape of part of the current of electricity by shooting off; and the fourth part consists of a sheet-metal bracket for connecting the rod to the building, which is so devised as to be made very cheap by being stamped out of sheet metal and finished by one blow of a drop-press.

Figure 1 is an elevation of a three-flanged rod, showing my improved coupling, the coupling-key, and the brackets, one of the couplings and part of the rod being sectioned. Fig. 2 is a front elevation. Fig. 3 is a cross-section. Fig. 4 is a perspective view of my improved sheet-metal bracket, and Fig. 5 is a perspective view of a slightly-modified form of the bracket.

A represents the three-flanged rod, which I propose to so construct that the surfaces of the flutes will represent, in cross-section, the segment of a circle equal to that of the circle containing the rod, and extending from edge to edge of the flanges. Each section is provided with a notch, B, in one of its ribs a short distance from the end to receive the coupling, which consists either of a short tube or short plate of metal wrapped around the ends of the sections, as shown at C, with the edges meeting at the bottom of the flute opposite the notched flange, and with a slot at its center, as at D, for the part E of the notched rib between said notch and the end to project through and allow the parts F of said plate to fall into said notches. H represents the coupling, made of a short section of a tube; it is also provided with a slot, D, for the projections E to enter, and allow the parts F to enter the notches B. As the tube must be large enough to slip over the parts E of the notched rib in adjusting the sections to be coupled, it will of course be too large when fitted into the notches. To remedy this I introduce a key, I, between the tube and the flute at the side of the rod opposite the notched flanges. I propose to make this key considerably longer than the coupling and let it point outward to facilitate the shooting off of the electricity. The tubes may be made either in the requisite form before being applied to the rods, or it may be put on in the cylindrical form, and then pressed into the flutes by any competent compressing or other suitable bending apparatus.

It will be seen that the sections of the rod are coupled together in this way with their ends meeting together snugly, and that they are locked very firmly and rigidly, without being materially reduced in size or capacity, as is the case with some other couplings, and this, too, without the use of set-screws, which are required with the cast-metal socket-couplings, and which, besides adding to the expense considerably, are liable to work loose and allow the sections to become disconnected.

My couplings may, of course, be of any length and strength of metal required; but it is not probable that they will require to be longer than the cast-metal socket-couplings, while it is evident they may be much lighter.

It will also be seen that this three-flanged form of the rod is peculiarly adapted to the use of this kind of coupling, especially when the latter is made of a tube, for the flute which is exactly opposite the notched rib receives the key in such manner as to fill up all the space between the coupling and the rods caused by dropping into the notches on the other side, and to draw the other sides of the coupling snugly into the bottom of the flutes, and only one notch and one slot are required; whereas if the rod have four flutes this lateral movement would cause two sides of the coupling to move sidewise relatively to their grooves in case the coupling was fluted previously to being put on, and if, being put on in cylindrical form, it is pressed into the flutes afterward, the work would be very much more difficult. But the said coupling is applicable to square and other shaped rods; and I propose to use it for coupling any shapes to which it is adapted. In case of square rods being coupled by it the tube will be made square, and the key will be fitted in at the side opposite the notches in the rod, or that side of the coupling may be pressed against the rod by bending it down in a groove along the center, and the key dispensed with. I also propose, for economizing in the cost of the brackets, to make them of sheet metal too, whereby, having devised a form that can be struck out and completely finished by one blow of a drop-press, I cheapen the cost of making them, and I get more strength with a given weight of metal. These improved brackets consist of the crotched plates L, having two branches, M, bending upward from the horizontal part, with a screw-hole at N in each. The horizontal part has a hole, O, for the rod A. These brackets may either have a central branch or arm, P, between the others, bending downward or not, as preferred, said branch serving as a brace for the bracket.

It will probably be found needful to use this brace when the bracket is made of thin metal; but, the metal being of suitable thickness, it will not be required, and generally it will be preferable not to use it, for, as the electricity runs downward mainly, it will be much more liable to be shot off against the building by these braces than by the arms M, which are purposely turned upward; but, whether said arm is formed on the bracket or not, the latter may be cut, shaped, and punched by one operation of a press, and thus be made very cheaply.

I claim as my invention—

1. A sheet-metal coupling for lightning-rods, consisting of a slotted plate or tube fitted upon the notched ends of the rods, and confined by being bent and pressed against the sides of the rod, or by the same and by a key, I, all substantially as specified.

2. I also claim the combination of a three-flanged rod and a sheet-metal slotted coupling fitted to the notched ends of the joints to be coupled, all substantially as specified.

3. I also claim the points for shooting off the current of electricity formed by the prolongation of the locking-keys I, substantially as specified.

4. I also claim the crotched sheet-metal bracket with arms M, bent upward for attachment to the building, and either with the brace P or not, all substantially as specified.

JAMES ROBERTSON.

Witnesses:
JAMES PRICE,
JAMES LYMAN PRICE.